Patented Nov. 13, 1928.

1,691,044

UNITED STATES PATENT OFFICE.

JOSEPH BRESLAUER AND EDOUARD DE LUSERNA, OF GENEVA, SWITZERLAND, ASSIGNORS TO SOCIÉTÉ D'ETUDES CHIMIQUES POUR L'INDUSTRIE, OF GENEVA, SWITZERLAND, A CORPORATION OF SWITZERLAND.

PROCESS OF RENDERING CALCIUM CYANAMIDE FREE FROM DUST.

No Drawing. Application filed January 11, 1927, Serial No. 160,517, and in Switzerland January 22, 1926.

This invention relates to a dust free calcium cyanamide and to a process of rendering the ordinary calcium cyanamide free from dust Crude calcium cyanamide always contains a quantity of free lime and has an alkaline reaction. The crude material has a tendency to crumble and powder and, in its application as a fertilizer to fields, the powder tends to blow about and cover the persons and horses engaged in distributing it over the fields. Because of its alkalinity it is, therefore, very disagreeable to handle and is objectionable from this standpoint.

An object of our present invention is to provide a granular, dust free calcium cyanamide that is free from the above indicated objectionable features.

Another object of our invention is to provide a process of rendering calcium cyanamide granular and free from dust.

With these and other objects in view, the invention comprises the product and the process described and claimed in the following specification and claims.

The invention relates to a process of rendering calcium cyanamide free from dust, according to which the calcium cyanamide is mixed with an acid potassium salt which is readily fusible, for example, bisulphate of potassium, the acid phosphate of potassium, etc., which is heated to fusion. The mass is stirred or otherwise agitated so as to obtain a granular product without dust, containing nitrogen and potassium and free from dicyandiamide. The mixture of calcium cyanamide and potassium salt can be effected cold, the mixture being afterwards heated until the acid potassium salt melts.

The calcium cyanamide can also be introduced in small portions stirred into the melted acid potassium salt.

*Example.*

Bisulphate of potassium is intimately mixed with twice its weight of powdered calcium cyanamide, the mixture is then heated until the bisulphate fuses, that is to say to a temperature of about 200° C. The calcium cyanamide is agglomerated and there is obtained a granulated product without dust, containing 12.5 per cent of N and 11.75 per cent of $K_2O$ and containing no dicyandiamide.

What we claim is:

1. A process of producing calcium cyanamide free from dust which comprises treating calcium cyanamide with a molten easily fusible acid salt at a temperature low enough to avoid extensive decomposition of the calcium cyanamide.

2. A process of producing dust free calcium cyanamide comprising treating calcium cyanamide with molten acid potassium salt and stirring the melt to obtain a granulated product, the temperature of said molten acid potassium salt being below that at which it would react extensively with said calcium cyanamide.

3. A process of producing dust free calcium cyanamide which comprises mixing calcium cyanamide with a substantially dry acid salt, then heating said mixture until said acid salt fuses.

4. A process of producing dust free calcium cyanamide which comprises mixing it with substantially dry acid potassium sulphate and heating said mixture until said acid potassium sulphate fuses while stirring said mixture.

5. A granular dust free cyanamide comprising calcium cyanamide having a fused coating of an easily fusible acid salt.

6. A dust free granular cyanamide which comprises calcium cyanamide in a fused acid potassium salt.

In testimony whereof we affix our signatures.

JOSEPH BRESLAUER.
EDOUARD DE LUSERNA.